Figure 1:
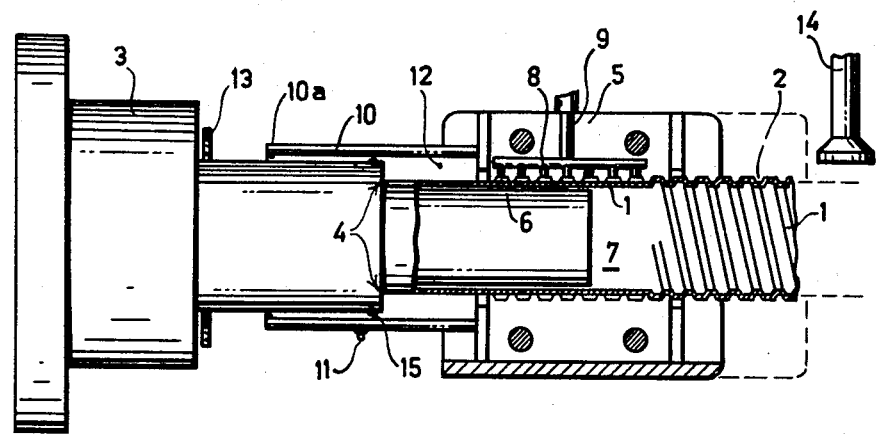

United States Patent [19]
Van Zon

[11] 3,711,232
[45] Jan. 16, 1973

[54] DEVICE FOR MANUFACTURING A PLASTIC TUBE

[75] Inventor: Cornelis Van Zon, Zwolle, Netherlands

[73] Assignee: Industriele Onderneming Wavin N.V., Zwolle, Netherlands

[22] Filed: Oct. 24, 1969

[21] Appl. No.: 869,206

[30] Foreign Application Priority Data

Oct. 13, 1968 Netherlands..........................6815449
April 24, 1969 Netherlands..........................6906380

[52] U.S. Cl.................425/150, 425/326, 425/389, 425/393
[51] Int. Cl..........................B29d 23/03, B29d 23/04
[58] Field of Search ...18/19 TC, 19 TM, 19 A, 19 R, 18/14 A, 5 BB, 5 BE, 5 BP; 264/99, 286; 425/150, 326, 389, 393

[56] References Cited

UNITED STATES PATENTS

| | | | |
|---|---|---|---|
| 2,790,994 | 5/1957 | Cardot et al.........................18/5 BP |
| 3,188,690 | 6/1965 | Zieg...................................18/19 TC |
| 3,538,209 | 11/1970 | Hegler...............................18/14 A |
| 3,114,172 | 12/1963 | Coste..............................18/19 TM X |

FOREIGN PATENTS OR APPLICATIONS 1,266,643   6/1961   France..........................18/5 BE Primary Examiner—H. A. Kilby, Jr.
Attorney—Irving M. Weiner

[57] ABSTRACT

A device for manufacturing a plastic tube with transverse or helical grooves comprised of an extruder, and a die consisting of two movable halves forming a mold cavity with a ribbed profile through which the tube is extruded. The halves of the die are each provided with semi-circular elongated heating elements or members for heating a region between the opening of the extruder and the beginning of the die forming the mold cavity. One embodiment of the present invention uses an inflatable member disposed interior to the tube which when inflated forces the tube outwardly causing portions of the tube to conform to the grooves in the mold cavity to form a ribbed profile in the tube. The inflatable member comprises a movable cylinder having an inflatable wall and two expandable spaced apart end discs. Another embodiment of the present invention comprises an inflating member having two spaced apart expandable closing discs which, when expanded, communicate with the interior wall of the plastic tube thus, creating a high-pressure chamber therein. A spring-loaded valve for controlling the ingress and egress of the inflating medium, such as compressed air, into and out of the pressure chamber is situated between the two closing discs. The inflating medium trapped in the chamber under high pressure exerts a force on the tube thus, displacing portions of the tube into the ribbed profile in the mold cavity to form transverse or helical grooves in the tube.

9 Claims, 5 Drawing Figures

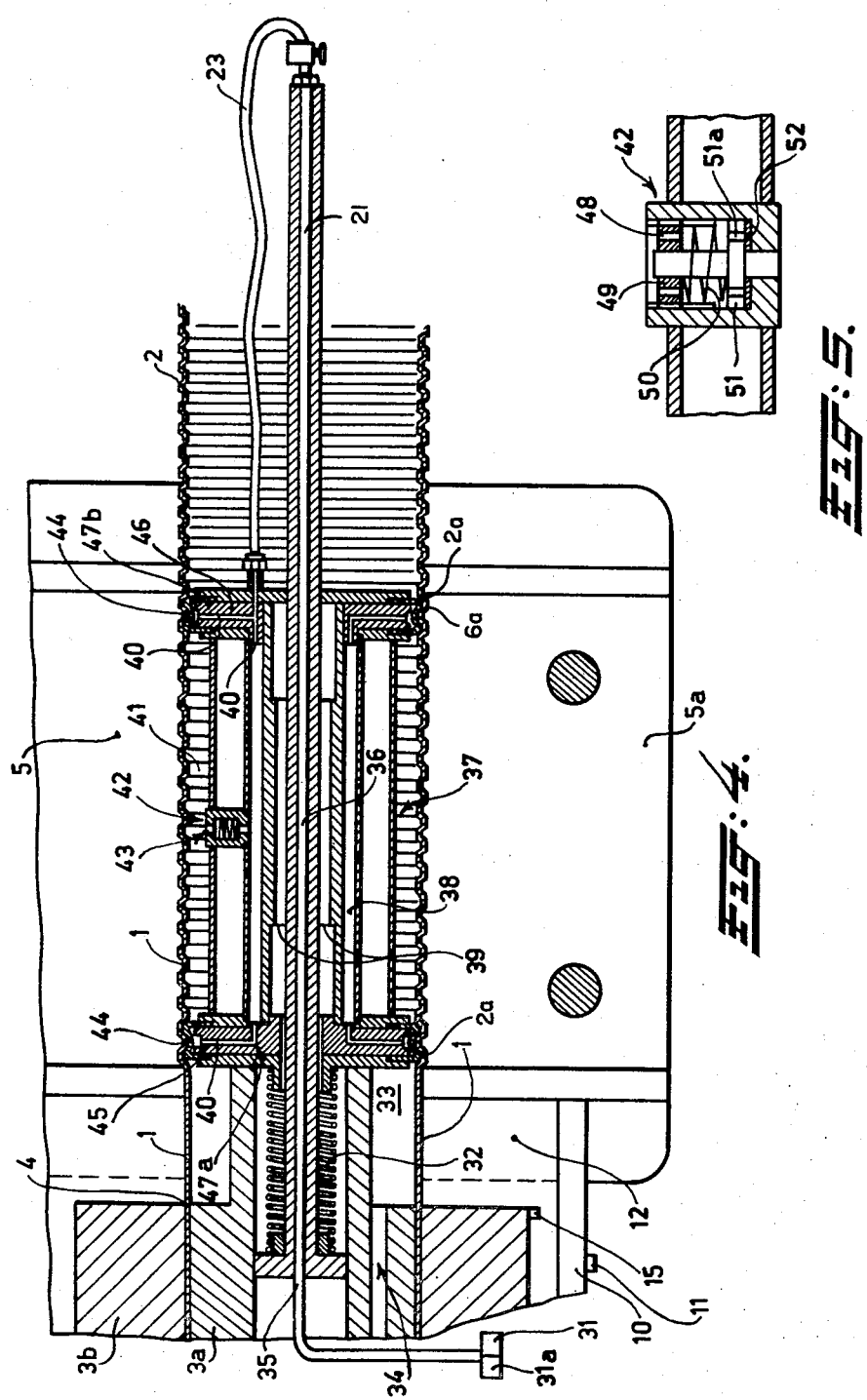

DEVICE FOR MANUFACTURING A PLASTIC TUBE

The invention relates to a device for manufacturing a plastic tube with transverse grooves comprising at least an extruder with an annular mouth and a die having two moveable halves, each die half has a semi-tubular mould cavity with a ribbed profile, the halves of the die being movable along paths in such a way that over a part of their paths the opposite halves of the die, provided if desired with cooling means, cooperate with one another to form a singular tubular mold therebetween. Means are provided to generate a pressure differential between the interior and exterior of the plastic tube resulting in a higher pressure interior to the tube than exterior to the tube when it is in the mould in order to force the plastic into grooves forming the ribbed profile in the mold cavity. The expression transverse grooves comprises also helical grooves.

Such devices wherein two rows of die are movable along endless guide paths are known in itself. These devices are, however, exclusively suitable for manufacturing flexible plastic tubes of smaller diameter with transverse grooves. As soon as plastic tubes with transverse grooves of larger diameter of 500 mm and the like are to be manufactured these devices become so large that they occupy too much space, or the costs for the construction of such machines is not justified from the point of view of production.

Since there is much interest for plastic tubes with transverse grooves of large diameter which are combined with thinwalled plastic inner tubes which are smooth on their inner side, whereby for such tubes of large diameter it is possible to economize considerably on material it has often been tried to provide a simple device which does not the aforementioned drawbacks.

It is an object of the invention to provide a simple method and device in which the aforementioned difficulties have been obviated.

This object is attained, according to the present invention, in that the device consists of a die having two halves, heating means for supplying heat to the region situated between an annular mouth piece of an extruder and the die in its extreme active position, driving means for controlling the rate of moulding of the plastic tube by extruder, the means for separating the two halves of the die, means for returning the two halves of die to the start of their operative position, and a delimiting member which limits the return point of the die. The delimiting member is adjusted in such a way that, when the active phase commences, the last transverse groove formed in the plastic tube or the land portion formed in the plastic tube, which lands and grooves form the ribbed profile in the plastic tube cooperate with the last rib profile in the die at the end opposite the extruder mouth piece.

Such a device is advantageous in that only two halves of a die need be used thereby simplifying the construction of the required device, and as a consequence the cost of production can be considerably reduced. Moreover tubes of a different diameter can be easily manufactured by quickly changing the size of the two piece die. Due to the application of two die halves that part of the plastic tube situated between the end of the die and the annular mouth piece of the extruder would cool down on moving the die in its active phase, owing to which the desired formation by means of an external vacuum or an pressure differential between the interior and exterior of the plastic tube is no longer possible. This trouble is now overcome by using a heating means preferably an elongated heating element or member disposed to heat the plastic tube situated between the annular mouth piece of the extruder and the end of the cooperating die halves to keep it in a plastic condition.

In order to ensure that regularly formed transverse grooves are produced in the plastic tube the driving means for the rate of extrusion of the tube by the extruder, means for separating the two halves of die from each other at the end of their operative position, means for returning the halves of die, after the formation of the transverse grooves, to the start of their operative position, and the delimiting member, delimiting the return of the halves of die, are related to each other in such a way that on starting the operative phase at least the last groove formed on the plastic tube can cooperate with the last rib profile in the die at the end opposite the mouth piece of the extruder.

Figure 2:
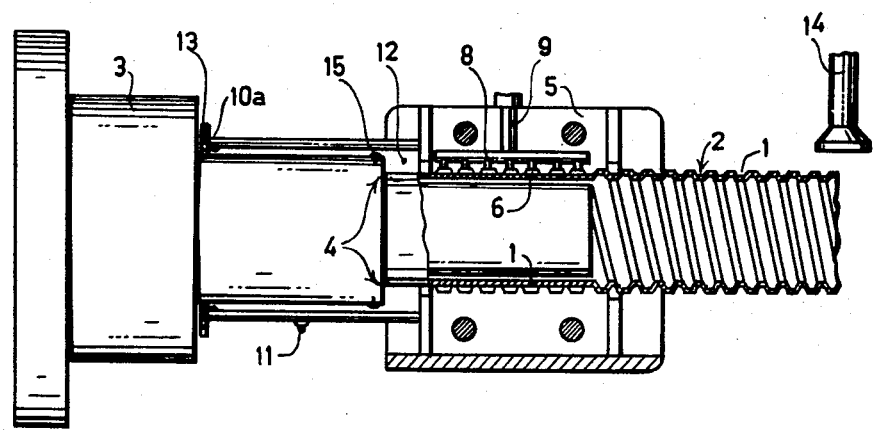
Figure 3:
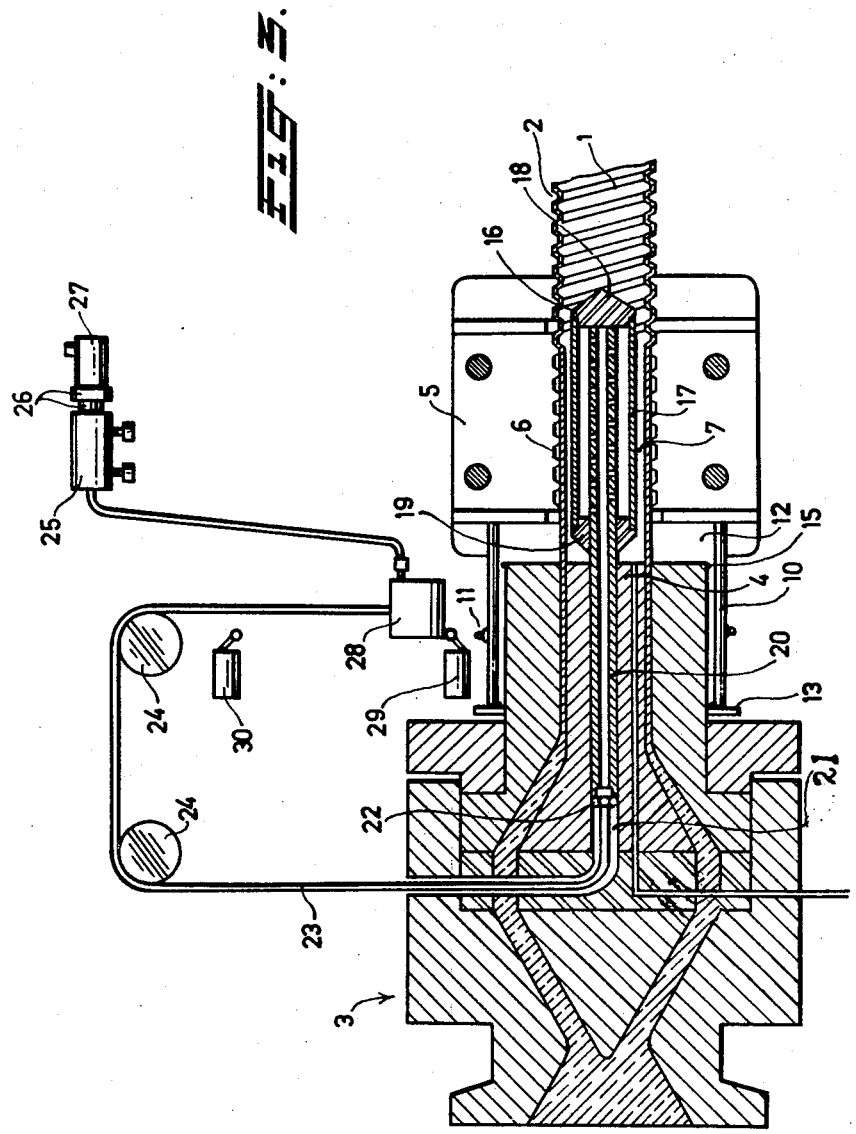

The invention will now be clarified with reference to the drawing in which an embodiment of the device according to the invention is represented:

FIG. 1 shows a section of a vacuum device according to the invention in the operative position with a part of a moulded plastic tube;

FIG. 2 a like device according to FIG. 1 in the beginning of the operative position, and FIG. 3 a device for providing transverse grooves in the plastic tube by applying an inflatable member instead of applying vacuum;

FIG. 4 a device according to FIG. 3 with a preferred member for applying pressure to the plastic tube from the inner side;

FIG. 5 a detail of an adjustable pressure regulating means used in a device according to FIG. 4.

Represented in FIG. 1 and 2 is a device for manufacturing a flexible plastic tube 1 with transverse grooves 2 by creating an external vacuum. The device consists of a partially represented extruder 3 with an annular mouth piece 4 and a die composed of two halves 5, 5a. Each die half 5, 5a is semi-tubular and provided with a portion of a ribbed helical profile 6. The two die halves 5, 5a are movable in a longitudinal direction in guides (not shown) and can be driven by drive rollers. The opposite die halves 5, 5a cooperate with one another in their operative position to form a hollow mold cavity 7 having a continuous ribbed helical profile. The halves of die 5, 5a are provided with suction channels 8 which can be connected to a vacuum system via the duct 9.

According to the invention, two semi-circular elongated heating elements 10 cooperate to form a circular elongated heating element heatable via connecting terminals 11. These semi-circular elongated heating elements 10 are so long that in the extreme operative position of the halves of die, as represented in FIG. 1 in dotted lines, the annular mouth piece 4 of the extruder 3 is situated within the tubular part 12 formed when the heatable semi-circular parts 10 cooperate with each other. In this way the tube 1 remains in such a plasticized condition that it can be deformed by pressure, for example, it can be maintained at a temperature of 120° C required if the tube 1 is made of a PVC material.

The position of return of the die halves 5, 5a is limited by the end 10a of the elongated heating elements 10 which abuts against a delimiting plate member 13. This plate member 13 is situated in such a way that at any particular rate of formation of plastic tube by the extruder 3 and at a velocity synchronized to the rate of formation of the plastic tube by the extruder at which the two die halves 5, 5a are returned to the start of the operative position, the last rib profile 6a in the die halves 5, 5a engages the last transverse groove part 2a already formed. A nozzle 14 ensures the cooling of the tube as it exits from the die halves 5, 5a. A switch 15 operated by the end 10a of the semi-circular elongated elements 10 determines the time at which the die halves 5, 5a move apart, and their return to the initial position.

The device operates as follows. By means of extruder 3 a plastic tube 1 is extruded from the annular mouth piece 4. Now the die halves 5, 5a are disposed on this plastic tube, whereby due to a created vacuum via the suction channels 8 the tube 1 is sucked and due to the rib profiles 6 transverse grooves 2 form in the plastic tube 1.

After reaching their extreme position the switch 15 is excited and the die halves 5, 5a move apart and are returned into their initial position. Thereupon the die halves 5, 5a move again toward one another and the rib profile 6a is applied to the last transverse groove 2a which was previously formed in the plastic tube.

During the movement of the dies in their operative position whereby the transverse grooves are provided in the tube part of the plastic tube 1, the portion of the plastic tube 1 situated between the mouth piece 4 of the extruder 3 and the die halves 5, 5a remains sufficiently heated and plasticized, due to the heatable semi-circular elements 10 which cooperate with each other to form the tubular part 12 through which the tube 1 travels from the annular mouth piece 4 to the die halves 5, 5a, to allow its deformation by the vacuum when it is in the die halves 5, 5a.

According to FIG. 3 an inflatable member is used for the deformation of the tube. Identical parts are denoted by identical reference numerals. Instead of suction channels 8, the device is now provided with a movable member 16 having an elastic inflatable wall 17. This wall 17 is secured on two spaced apart fastening plates 18 and 19 which are mounted on a stiff hollow rod 20. Rod 20 is movable in a bore 21 formed in the extruder head. An end 22 of the rod 20 is connected to a flexible hose 23 which runs over two rollers 24 to a three way valve 25. The valve 25 is a compressed air container 26 and a vacuum pump 27. The hose 23 is provided with a weight 28 which can operate with a switch 29 and 30. The switch 30 connects the three way valve 20. to the vacuum pump 27, while the switch 29 connects the three way valve to the container 26 of compressed air. Due to the dead weight of the weight 28 the moveable member 16 is returned to its initial position. In this position the wall 17 will be inflated by means of switch 29 and container 26 of compressed air and the plastic tube will be pressed into the ribbed helical profile 6 of the die halves 5, 5a. During the movement of the halves of die the moveable member 16 is taken along, but in the final position the weight 28 operates the switch 30, whereby the vacuum pump 27 sucks off the medium in the member 16 thus deflating it. Due to the weight 28 the rod 20 with member 16 is returned to the starting position whereupon the switch 29 is again excited.

Obviously it is also possible to provide a stopper in the plastic tube which is stationary with respect to the extruder and to supply the compressed air directly via the bore 21. If desired the wall 17 may be provided with protruding parts fitting in recesses provided in the protruding profiled portions 6 whereby simultaneously with the inflation apertures are formed in the plastic tube.

As to the displacement of the halves of die various displacement means are usable. So for instance the die halves 5, 5a may be guided according to rectangular paths with rounded passages, and the displacement may be effected by rollers which can be driven in two positions. It is also possible to displace the die halves 5, 5a by means of a chain and gear wheels (not shown).

The device represented in FIG. 4 comprises a partially represented extruder 3 consisting of a core 3a and a casing 3b, with an annular mouth piece 4 and a die having two halves 5, 5a. Numerals corresponding to numerals in FIGS. 1 – 3 have the same meaning.

For the formation of the grooves 2 in the plastic tube 1 the device is provided with a moveable inflator member 37 movable in the operative track of the hollow mould (formed by dies halves 5, 5a) on a supporting rod 36 connected with the core 3a. The inflating member 37 is comprised of two spaced apart expandable closing discs 47a and 47b and at least one outlet 43 for a medium used to inflate the moveable inflator member 37, situated between the closing discs 47a, 47b. This outlet 43 for the medium is disposed on a cylinder 38 which via a hose 23, communicates with the bore 21 which extends through the rod 36. A cylinder 38 carries at its opposite ends the closing discs 47a, 47b. Adjustable pressure regulating means 42 is provided in the outlet 43 for the medium in such a way that compressed medium, supplied via a bore 35 running through the core 3a and rod 36, and the hose 23, cannot directly flow off via the outlet 43 for the medium before the closing discs 47a, 47b cooperate with the tube 1 to form a closed space 41 which is bounded by the two expandable closing discs 47a, 47b the moveable inflator member 37 and the die halves 5, 5a. The closing discs 47a, 47b have bores 40 and rubber sealings 44 secured thereon. The bore 40 connects the hose 23 to the interior of the cylinder 38, and connects the hose 23 to the rubber sealings 44. Via the bore 40 a compressed medium from the hose 23 can inflate the rubber sealings 44. Plates 46 secure the closing discs 47a, 47b and rubber sealings 44 in place on the cylinder 38.

The pressure regulating means 42 consists of a shutoff valve 51 loaded by a spring 50 and cooperating with a seat 52. Provided in the valve 51 are apertures 51a through which compressed medium is allowed to pass when the shutoff valve is removed from the seat, the compressed medium being capable of flowing from the outlet 43 for the and medium via apertures 48 in the plate 49 which retains the spring. The inflator member 37 is secured by bearings 39 on the rod 36. The spaces provided between the bearings 39 ensure that on moving the inflator 37 a space 33 formed by the tube 1, core 3a and closing disc 47a communicates with the surroundings. If desired a second bore 34 may be provided in the core 3a which communicates through the core 3a with the outerside of the device and the space 33 within the annular mouth piece 4.

The device is further provided with means for limiting the displacement of the movable inflator 37, which, for example, consists of a micro switch 15 connected with a source of compressed medium, a compressor 31a. This micro switch can, e.g., operate also a vacuum pump 31.

The moveable inflator member 37 is further connected to a means for moving this member 38 from its final position to a starting position, this means being in the shape of a spring 32 situated in the core 3a. It is obvious that instead of a spring other means can be used in order to return the inflator member 37 to its original position, for instance a falling weight can be used to return inflator member 37 to its initial position.

The device operates as follows.

A plastic tube 1 is extruded of an extruder 3, this tube 1 is guided in the hollow mold cavity formed by the dies halves 5, 5a which are complementary to one the other. After the plastic tube is guided in this hollow mold cavity, a compressed medium, e.g., compressed air, is supplied to the cylinder 38 by the compressor 31a via bore 35 in rod 36 and hose 23. Due to the suitable adjustment of the pressure regulating means 42 that is to say by the aid of the pressure of the spring 50 on the shutoff valve 51, shutoff valve 51 is pressed against the seat 52. At first the compressed medium is supplied to the rubber sealings 44 of the closing discs 47a, 47b via the bores 40. After inflation, the rubber sealings 44 of closing discs 47a, 47b almost completely cooperate with the plastic tube 1. The plastic tube 1 is in juxtaposition with the die halves 5, 5a. The pressure in the cylinder 38 increases in such a way that compressed medium can escape via the shut off valve 51 into the space 41 bounded by plastic tube 1, the spaced apart closing discs 47a, 47b and the tube inflator member 37. Under the influence of the prevailing pressure in the space 41 the plastic tube 1 is pressed into the ribbed profiles 6 of the die halves 5, 5a. During this inflation the movable inflator 37 travels along with the likewise moving die halves 5, 5a until the micro switch 15 contacts a protruding portion of the semi-circular elongated heating elements 10. At that moment the micro switch 15 operates the compressor 31a whereby the latter is switched off and the bore 35 in rod 36, and the hose 23 and the cylinder 38 are connected to a suction member viz. the vacuum pump 31. The compressed medium is removed from the cylinder 38 and the expandable sealings 44 are deflated and return to their starting position so that the spaced apart closing discs 47a, 47b disengage from and clear the plastic tube 1. Due to the action of the spring 32 the inflator is again returned to its starting position where it is positioned such that the rubber sealings 44 of the closing disc 47b, upon expanding cooperates with the transversely grooved previously formed in the plastic tube by the succeeding forming operations. Simultaneously, the micro switch moves the die halves 5, 5a apart to disengage from the tube and returns again to their starting position.

Since during to the displacement of the inflator member 37, too high a pressure could be produced in the space 33 between tube 1, annular mouth piece 4 of the extruder 3, and closing disc 47a on account of leakage of, e.g., air from the closed space 41 between the rubber sealings 44 of the closing disc 47a and the tube 1, a second bore 34 extending through the core 3a is provided which operatively communicates with the space 33 and the outside of the device, whereby the compressed medium which may leak from the space 41 through the interface between sealing 44 of the closing disc 47a and the tube 1 can flow outwards preventing and undesired deformation of the plastic tube 1 which could otherwise be produced between the closing disc 47a and the annular mouth piece 4 of the extruder 3 due to air trapped in space 33. When the free end of semi-circular heating elements 10 contacts a delimiting plate 13 air is fed to the cylinder 36 via the bore 35 in rod 36 by the compressor 31a.

It should be noted that it is also possible to apply closing discs 47a and 47b which are provided between two plates, one of the plates being movable and as consequence being pressed by mechanical or medium pressure against the other when the closing disc expands.

The heating means or semi-circular elongated heating elements are heated to a temperature providing sufficient to produce plasticity of the tube in order to deform the tube by vacuum or pressure. A temperature of 120° C – 160° C is used for polyvinylchloride. Having thus described the invention and manner of its operation what I claim as my invention is:

What I claim is:

1. A device for manufacturing a hollow tubular member having transverse or helical grooves on its exterior surface which comprises:

at least one extruder having an annular mouthpiece;

at least two semi-tubular die halves each having a portion of a desired profile corresponding to a portion of said grooves to be formed in said tubular members on its concave surface, said die halves cooperate with each other to form a hollow tubular die having a desired profile on its interior surface corresponding to said grooves to be formed in said tubular member, said die halves being movable relative to each other in opposite directions perpendicular to a longitudinal centerline of said die to allow said die halves to engage and disengage said tubular member, said die being disposed adjacent said annular mouthpiece of said extruder such that said longitudinal centerline of said die formed by said die halves is in line with a longitudinal centerline of said annular mouthpiece;

said two semi-tubular die halves being movable in a longitudinal direction with said tubular member;

means for generating a pressure differential between the interior and exterior of said tubular member when said tubular member is in the mold cavity formed by said die halves, the interior of said tubular member being under a higher pressure than the exterior thereof to force the tubular member outwardly into said desired profile of said die halves; and means for limiting said pressure differential between the exterior and interior of said tubular member so that the newly extruded tube will not be subjected to said pressure differential between the exterior and interior of said tubular member, said limiting means being movable with said tubular member during cooperation of said die halves.

2. A device for manufacturing a hollow tubular member having transverse or helical grooves on its exterior surface which comprises:
   at least one extruder having an annular mouthpiece;
   at least two semi-tubular die halves each having a portion of a desired profile corresponding to a portion of said grooves to be formed in said tubular members on its concave surface, said die halves cooperate with each other to form a hollow tubular die having a desired profile on its interior surface corresponding to said grooves to be formed in said tubular member, said die halves being movable relative to each other in opposite directions perpendicular to a longitudinal centerline of said die to allow said die halves to engage and disengage said tubular member, said die being disposed adjacent said annular mouthpiece of said extruder such that said longitudinal centerline of said die formed by said die halves is in line with a longitudinal centerline of said annular mouthpiece;
   a hollow rod disposed along said longitudinal centerline of said die and extending through said annular mouthpiece of said extruder being movable along said longitudinal centerline of said die;
   a movable hollow member having at least two spaced apart fastening plates and a cylindrical inflatable wall situated therebetween concentrically disposed around said hollow rod located interior to and concentrically with said hollow tubular die spaced apart from said interior surface of said die to allow said tubular member to be inserted in said die between said interior surface of said die and said wall;
   a source of compressed air;
   a vacuum pump;
   a valve connected to said source of compressed air and said vacuum pump;
   a hose operatively connecting said valve to said source of compressed air and said vacuum pump;
   means to actuate said valve such that at the start of the operation said hose is operatively connected to said source of compressed air allowing said compressed air to flow into said moveable hollow member thereby inflating said hollow member and forcing said cylindrical inflatable wall outwardly towards said die thus forcing a portion of said tubular member situated between said wall and said die into said profiles in said interior surface of said die, and at the end of the operation to operatively connect said hose to said vacuum pump thus allowing said hollow member to be evacuated causing said inflatable wall to move inwardly away from said die and said tubular member disposed therein.

3. A device as defined in claim 2, wherein said means to actuate said valve comprises:
   at least two spaced apart switches, one of said switches being operatively connected to said vacuum pump through said valve, and the other of said switches being operatively connected to said source of compressed air through said valve; and
   a weight affixed to said hose disposed between said switches such that at the beginning of the operation said weight activates said switch operatively associated with said source of compressed air to allow compressed air to flow through said hose to said hollow member and at the end of the operation said weight activates said switch operatively associated with said vacuum pump to allow the evacuation of said hollow member through said hose.

4. A device for manufacturing a hollow tubular member having transverse or helical grooves on its exterior surface which comprises:
   at least one extruder having an annular mouthpiece;
   at least two semi-tubular die halves each having a portion of a desired profile corresponding to a portion of said grooves to be formed in said tubular members on its concave surface, said die halves cooperate with each other to form a hollow tubular die having a desired profile on its interior surface corresponding to said grooves to be formed in said tubular member, said die halves being movable relative to each other in opposite directions perpendicular to a longitudinal centerline of said die to allow said die halves to engage and disengage said tubular member, said die being disposed adjacent said annular mouthpiece of said extractor such that said longitudinal centerline of said die formed by said die halves is in line with a longitudinal centerline of said annular mouthpiece;
   a supporting rod disposed on said longitudinal centerline of said die and said longitudinal centerline of said annular mouthpiece of said extruder movable along said centerlines of said die and said annular mouthpiece;
   means defining a bore extending through said supporting rod along a longitudinal centerline of said rod;
   a movable inflator member affixed to said supporting rod for movement therewith having at least two spaced apart closing discs, a hollow cylinder disposed between said closing discs concentric with said supporting rod, said tubular member, said hollow cylinder and said closing discs cooperating to define a closed space, an outlet for a pressure medium from said hollow cylinder to said closed space situated in said hollow cylinder between said spaced apart closing discs, and means defining a bore extending through one of said closing discs most remote from said annular mouthpiece of said extruder, said bore operatively communicating with the interior of said hollow cylinder and the exterior of said device;
   a hose operatively connecting said bore through said closing disc to said bore through said supporting rod;
   means to supply a pressure medium to said interior of said hollow cylinder operatively associated with an end of said bore in said support rod opposite said end thereof which is operatively connected to said hose;
   means to exhaust said pressure medium from said interior of said hollow cylinder operatively associated with said end of said bore in said support rod opposite said end thereof which is operatively connected with said hose;

means to limit the longitudinal movement of said support rod and said inflator member along said centerlines of said die and said annular mouthpiece of said extruder;

means for returning said movable inflator member along said centerline of said die and said annular mouthpiece of said extruder from a final operational position to a beginning operational position;

means defining a bore extending through a portion of said annular mouthpiece of said extruder operatively associated at one end with a space defined by said closing discs disposed nearest said annular mouthpiece of said extruder, said annular mouthpiece of said extruder, and a portion of said tubular member situated between said extruder and said die, and at the other end with the exterior of the device to allow any inflating medium which may be trapped in said space to escape to the exterior of said device thus preventing a distortion of said portion of said tubular member between said extruder and said die;

an adjustable pressure regulating means disposed in said outlet;

said means to supply a pressure medium to said interior of said hollow cylinder supplies a pressure medium through said bore in said supporting rod, through said hose, and through said bore in one of said closing discs to said interior of said hollow cylinder, wherein the pressure exerted by said compression medium is confined until said pressure reaches a pressure which will cause said adjustable pressure regulating means to open allowing said compression medium to escape into said space defined by said hollow cylinder, said closing discs and said tubular member thereby exerting a force generally outwardly toward said die thus forcing a portion of said tubular member situated between said closing discs into said profile in said interior surface of said die, and after said tubular member is forced outwardly into said profiles in said interior surface of said die said means to exhaust said pressure medium from said hollow cylinder removes said pressure from said closed space through said adjustable pressure regulating means disposed in said outlet situated in said hollow cylinder, and any of said pressure medium which may have escaped from said closed space into said space defined by said annular mouthpiece, said closing disc nearest said annular mouth piece and said portion of said tubular member situated between said extruder and said die is allowed to escape through said bore extending through said portion of said annular mouthpiece of said extruder to the exterior of said device.

5. A device as defined in claim 4, further characterized in that each of said closing discs comprises:
   a rubber sealings member disposed around the periphery of said closing disc; and
   means defining a bore disposed in said closing disc, one end of said bore communicating with said rubber sealing member, and the other end of said bore communicating with said interior of said hollow cylinder, whereby when said compression medium is supplied to said interior of said hollow element a portion of said inflating medium is diverted through said bores in said closing disc communicating with said rubber sealings member to force said sealings member outwardly from the periphery disc and into contact with the interior surface of said tubular member thus creating a seal between said tubular member and said closing disc.

6. A device as defined in claim 4, wherein said adjustable pressure regulating means comprises:
   a seat disposed in said outlet substantially perpendicular to a longitudinal centerline of said outlet;
   a shutoff valve disposed in said outlet substantially perpendicular to said longitudinal centerline of said outlet adapted to engage and disengage said seat;
   means defining at least one aperture through said valve which is closed by said seat when said valve engages said seat thus preventing the flow of said pressure medium from said interior of said hollow cylinder, and is opened when said valve disengages from said seat thus allowing the flow of said pressure medium from said interior of said hollow cylinder;
   a spring situated adjacent to said shutoff valve opposite said seat to hold said shutoff valve against said seat to prevent said shutoff valve from disengaging from said seat until the pressure generated by said pressure medium is sufficient to overcome the force of said spring; and
   a plate spaced apart from said shutoff valve to retain said spring.

7. A device as defined in claim 2, further characterized in comprising:
   means to limit a movement of said moveable hollow member; and
   a micro-switch operatively associated with said means to limit said movement of said moveable hollow member and said pressure medium supply means and said exhaust means, such that at the beginning of the operation said micro-switch activates said valve to operatively associate with said pressure medium supply means and at the end of the operation said micro-switch activates said valve to operatively associate with said exhaust means.

8. A device as defined in claim 4, wherein said means to limit the longitudinal movement of said support rod comprises:
   a micro-switch operatively associated to said pressure medium supply means and said exhaust means, such at the beginning of the operation said micro-switch actuates to operatively associate said pressure medium supply means to said bore in said support rod and at the end of the operation said micro-switch activates said exhaust means to operatively associate with said bore in said support rod.

9. A device as defined in claim 4, wherein said means for returning said moveable inflator from a final operational position to a beginning operational position comprises:
   a spring disposed around said support rod abutting said closing disc closest to said annular mouth piece.

* * * * *